No. 776,516. PATENTED DEC. 6, 1904.
M. H. JOHNSON.
MOLD FOR MAKING CEMENT BLOCKS.
APPLICATION FILED MAR. 2, 1904.
NO MODEL. 2 SHEETS—SHEET 1.
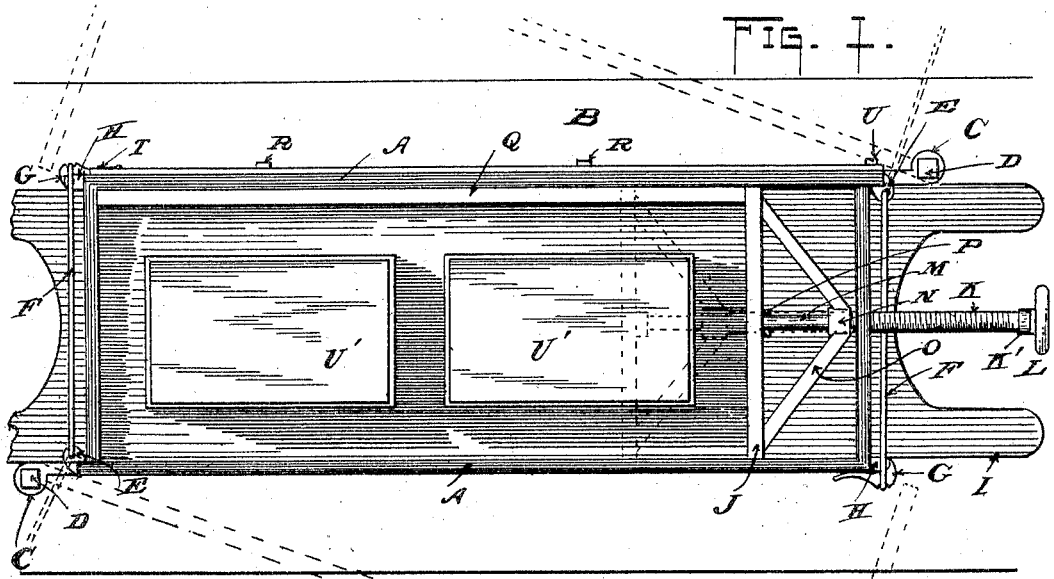
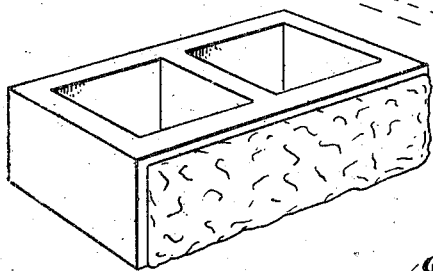
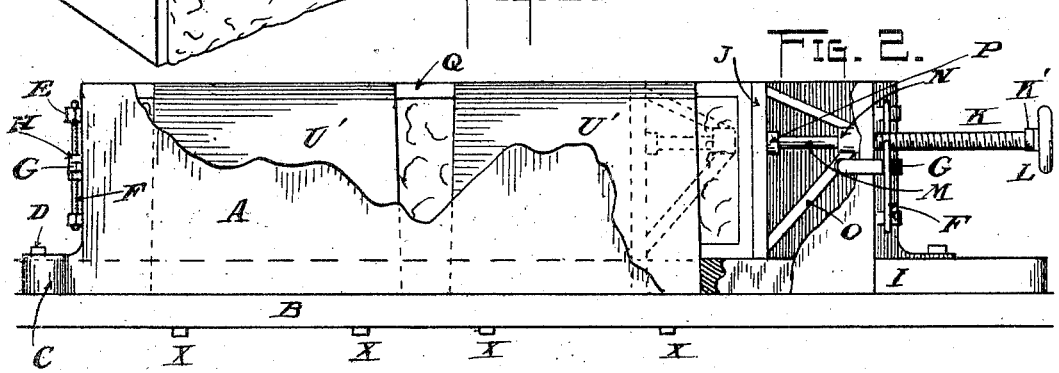
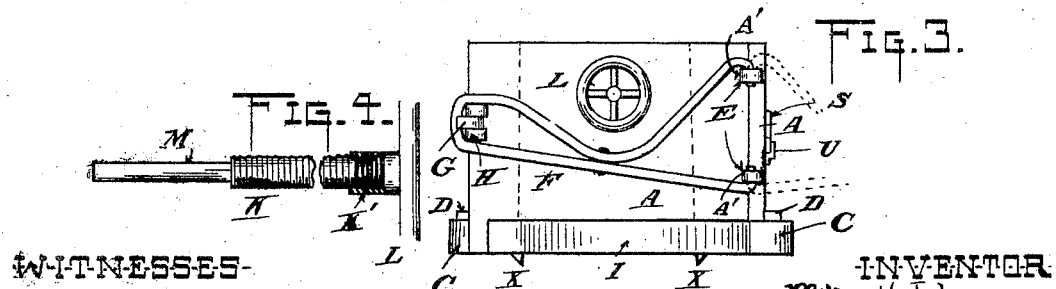
WITNESSES
Mae Davis
Wm Coble
INVENTOR
Milton H. Johnson
By L. M. Thurlow,
ATTY.

No. 776,516. PATENTED DEC. 6, 1904.
M. H. JOHNSON.
MOLD FOR MAKING CEMENT BLOCKS.
APPLICATION FILED MAR. 2, 1904.
NO MODEL. 2 SHEETS—SHEET 2.
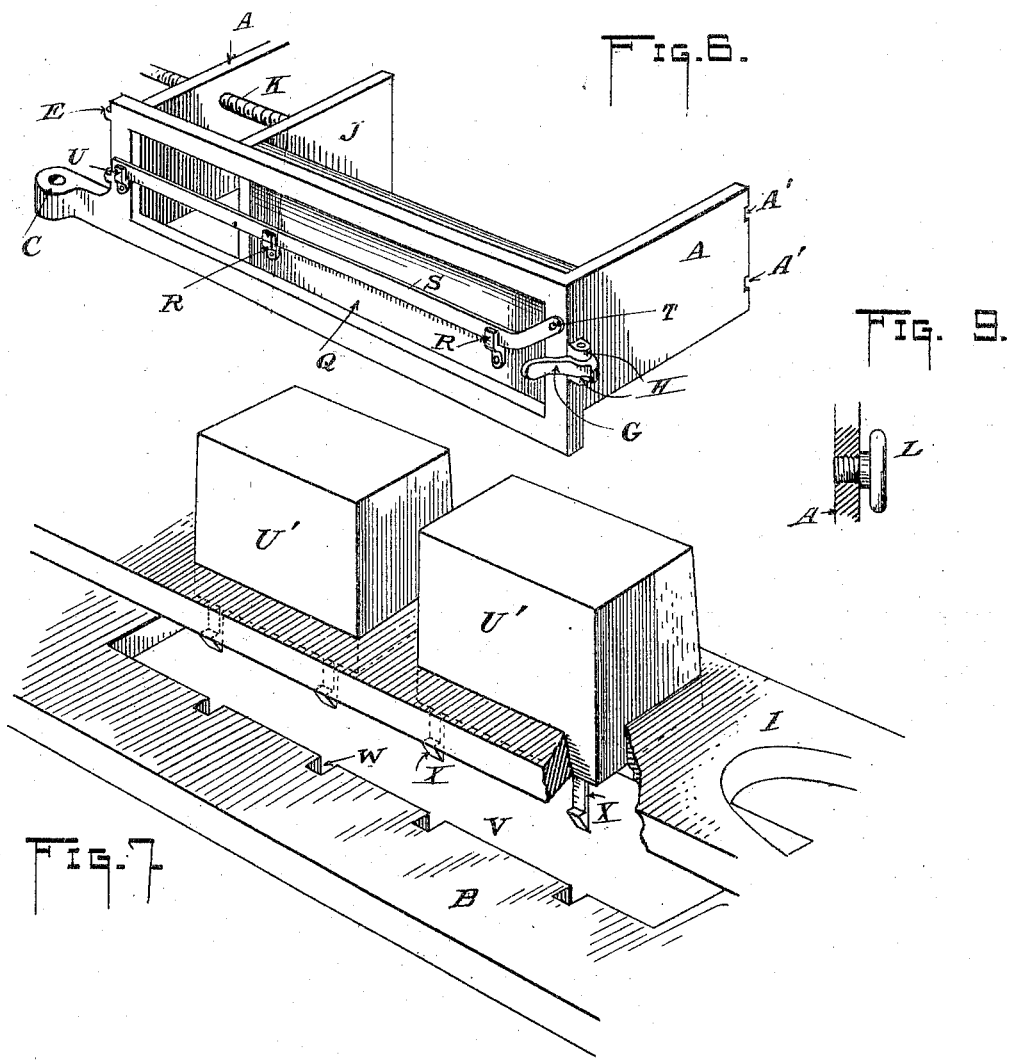
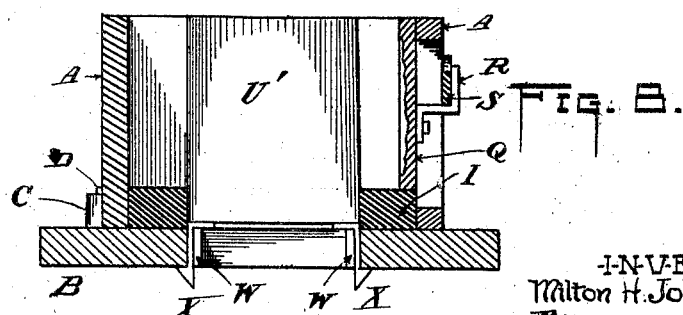
WITNESSES- INVENTOR-
mae Davis Milton H. Johnson
Wm Polk By L. N. Thurlow,
Atty.

No. 776,516.

Patented December 6, 1904.

UNITED STATES PATENT OFFICE.

MILTON H. JOHNSON, OF PEORIA, ILLINOIS.

MOLD FOR MAKING CEMENT BLOCKS.

SPECIFICATION forming part of Letters Patent No. 776,516, dated December 6, 1904.

Application filed March 2, 1904. Serial No. 196,245. (No model.)

*To all whom it may concern:*

Be it known that I, MILTON H. JOHNSON, a citizen of the United States, residing at Peoria, in the county of Peoria and State of Illinois, have invented certain new and useful Improvements in Molds for Making Cement Blocks; and I do hereby declare that the following is a full, clear, and exact description of the invention, which will enable others skilled in the art to which it appertains to make and use the same.

This invention pertains to molds for forming cement blocks, and has for its object to provide a mold which may be easily and quickly separated to liberate the molded block.

A further object is to provide a mold which when assembled for receiving the cement will be strong and rigid, but which can be instantly unlocked and carried out of the way, leaving the formed block free to be carried away for setting and drying.

A further and important object is to provide a mold that will be as efficient and as easily handled as a machine, with the advantage of cheapness because of few parts and simple arrangement.

In the drawings accompanying this application, Figure 1 is a plan view of my mold. Fig. 2 is a side view thereof with parts broken away to show arrangement of parts. Fig. 3 is an end view of the same. Fig. 4 is a view of a thread-bar used for adjusting a movable head. Fig. 5 is a perspective view of a block of the form molded in my improved apparatus. Fig. 6 is a perspective view of a portion of the mold, showing an adjustable head and a removable panel and a locking-lever for holding the latter in place. Fig. 7 is a perspective view of two cores, a false bottom, and a portion of a slotted table, all of which are employed in forming the cement block. Fig. 8 is an end section of the mold and table on which it is placed, showing means of securing a core in place during the forming of a cement block. Fig. 9 is a sectional view of a portion of one end of the mold, showing means for closing the opening for the thread-bar which adjusts the movable head described.

The mold consists of two L-shaped members A, which together form the ends and sides, as shown in Fig. 1. These members are mounted to swing away from one another on a table B or other support, being pivotally mounted thereon by extensions C and bolts D, said extensions forming part of each member A, as illustrated. Above said extensions are two lugs E E, cast with the members A, said lugs having holes therethrough to receive the ends of a locking-bail F, whose free looped end is designed and adapted to engage with a notched lever G, pivoted between two lugs H on the opposite corner of the members A from the lugs E. The levers G are so pivoted with reference to the notches therein which receive the said bails F that when thrown to the position shown in Fig. 1 the end of the bail in engagement therewith will be carried over beyond the pivot-point of the lever to form a lock which cannot be released until the lever is thrown outward by the operator, all of which will be clearly understood. By the means just described it will be at once evident that the mold will be firmly held as one rigid member. A false bottom I lies beneath the mold thus constructed, the ends of the latter being cut out at the bottom to admit said bottom. The cement of which the blocks are made may now be filled into the mold and when sufficiently set to retain its form may be removed by unlocking the bails F and throwing the members A apart and lifting the false bottom on which the block lies. Said block may now be set away to dry and another false bottom put into the mold and the sides closed to form another block. The said bottom portions I are cut out at the ends in order to provide handles by which they may be readily laid hold of. The mold may be used in this manner, or other members, such as I will now describe, may be used in conjunction therewith. For instance, in order to provide means for making blocks of different lengths an adjustable end J is used, the same being operated by means of a thread-bar K, having a hand-wheel L. Said thread-bar runs through a threaded hole at one end of the mold and has a shank M, which passes through a sleeve N, held rigid with the head J by means of arms O, as shown. The free end of said shank is socketed in a boss P on said end J, as shown in Fig. 1. Now by turning the thread-bar toward the right the end J will be carried toward the farther end of the mold, thus providing for shorter lengths of blocks, or when it is desired to lengthen the blocks the thread-bar may be turned in the opposite direction and the other hand used to cause the end J to follow the thread-bar, or, again, if it is desired to remove the said end J it may be slipped off the shank M and removed from the mold entirely, after which the thread-bar is unscrewed from the end A and the hole in said end closed to prevent exit of the cement. I provide a ready means for closing this hole, which consists in removing the hand-wheel L from the end of the bar K and screwing its threaded stem into the said hole in the end A, as shown in Fig. 9. The said wheel is merely attached to the thread-bar by being screwed into a sleeve or union K' thereon, as shown in Fig. 4. By the means just described it will be seen that blocks of any length may be made at a moment's notice by an exceedingly-simple arrangement. Again, if it becomes desirable to make a block with a roughened face to indicate or imitate chipped stone a panel may be set into the mold, as shown at Q in Figs. 1, 2, 6, and 8. This panel consists of a member one surface of which is indented and roughened, as indicated in section in said Fig. 8. The opposite surface of said panel is provided with keepers R, Fig. 6, for receiving a lever S, one end of which is pivoted at T near one corner of one of the members A, Fig. 6. The opposite end of said lever is held in a keeper U at the opposite end of the member A, and said member is cut out to form an open frame within which is placed the panel before described, the said keepers R projecting through the open side to be engaged by the said lever S. When thus held, the adjustable end J is carried up against the panel, as shown by Figs. 1, 2, and 6, and the device is ready for work. The panels may be of all lengths or any length, so that any desired length of block can be formed.

In addition to the above I provide core-blocks U', which are seated centrally within the mold and around which the cement is placed. These are for the purpose of lightening the manufactured block and also to effect a saving of material. The block is just as strong, and, furthermore, by having the openings shown in Fig. 5 a circulation of air is provided through the wall of the buildings formed of the blocks. I prefer to seat these cores U' upon the table B and cut out the false bottom I to fit over said cores, as shown in Fig. 7. The said table is slotted at V, and the edges left thereby are provided with notches W, Figs. 7 and 8, into which enter spring-catches X, secured to the cores. Said catches in entering the notches strike the corners thereof on the surface of the table, and being beveled a pressure on the cores will force said catches to move toward each other, thus allowing them to descend in the notches. Then when reaching the under surface of the table they will be freed and will regain their normal positions, thus locking the cores in place. Evidently one or more of the cores may be employed, as desired, and the false bottom can be cut out to accommodate them, said bottom being lifted therefrom in removing the cement blocks. It is evident that any other means than those shown and described may be used for locking the panels in place in the mold and for securing the cores in place. Likewise other means may be adopted for locking the members A together, as I do not wish to confine myself by any means to the structures set forth. As an instance of the manner in which the device may be modified I may so arrange the panel Q that it may be inserted between the upper and lower portions of the member A in Fig. 6, so that it will not take up any of the width of the mold—in other words, so that its inner surface will be flush with the inner surface of the said member A.

In Fig. 1 the members A are shown separated in dotted lines, the same being swung on the bolts D, before described. It will be seen that this separation permits the false bottom I to be raised, as described hereinbefore, for the purpose of removing the cement block. The table B is preferably covered with iron, so that in swinging these members A its surface will not be worn or cut away. In order to provide means for preventing the portions A from racking up and down in use, notches A' are made at the corners of the abutting ends thereof, as in Fig. 6, to engage with the lugs E, which hold the ends of the bail F. This prevents these ends from working vertically and at the same time provides a guide by which the members are properly placed together each time the mold is closed for work.

Having thus described my invention, I claim—

1. A mold comprising two inclosing members each consisting of a side and an end, each end portion being located at the extreme of one of the sides, the sides and ends being normally and relatively rigid, a base-plate the sides being pivoted at the opposite free ends thereto, a false removable bottom lying on the base-plate between the sides, the ends being undercut to allow the said ends to pass over the said false bottom, and means for locking the members together above the bottom to constitute the mold.

2. A mold for the purposes described comprising two pivoted normally rigid L-shaped inclosing members adapted to be pivotally swung toward and away from one another in the manner shown and described, and forming a rectangular mold when closed, a base-plate for such members and upon which they are pivoted, a false bottom lying upon the base-plate and filling the space between two opposite portions of the members when the mold is closed, said portions resting upon the said base-plate, the remaining oppositely-placed portions being undercut to allow them to pass over the said false bottom as described.

3. A mold consisting of two normally rigid L-shaped members, a base-plate to which each member is pivoted at one of its free extremities, a false bottom lying upon the base-plate between two opposite portions of the members, the remaining opposite portions being undercut to permit them to pass over the said false bottom when the mold is closed, one of the said portions of the members having an opening therein and constituting a frame, removable panels adapted to be positioned therein and lever mechanism for locking the panels in the frame substantially as set forth.

4. A mold consisting of two members each comprising a side and end of the mold relatively rigid, said members pivoted to a common support at their extremities remote from the said ends as shown and adapted to swing to and from one another for the purposes described, means for locking them together, a movable head, a removable panel having a roughened depression therein for the purposes explained, means for securing the panel in position within the mold, removable cores about which the cement is placed in making cement blocks, and a removable false bottom having openings therein to permit said bottom to pass over the cores substantially as shown and described.

5. A mold consisting of two normally rigid L-shaped members, a common support to which they are pivoted, each at one of its free ends, an adjustable head within the mold for changing the length thereof, and a thread-bar therefor adapted for adjusting said head as described and shown.

6. A mold consisting of two members each comprising a side and end relatively rigid, said members pivoted to a common support at their extremities remote from the said end portions, means for locking them together to form an inclosure, a thread-bar adjustable in the end of one of the members, a head carried at the inner end of the thread-bar, a single panel within the mold the same having a roughened depression therein for the purposes described, said panel lying in the side of the mold between an end thereof and the adjustable head as set forth.

7. In a mold for forming cement blocks, two separable members A A each pivoted upon a support and adapted to swing on said support away from each other, devices for locking said members together, a removable false bottom for the mold, core-blocks detachably secured to the support, there being openings in the false bottom to receive the said core-blocks, an adjustable head within the mold for reducing or increasing the molding area of the said mold, means for adjusting said head and removable panels for the mold adapted to be held in place for the purposes set forth.

8. In a mold for forming cement blocks, two members adapted to form a rectangular inclosure, means for securing said members together, said members also adapted to separate to liberate the formed block, core-blocks in the mold for the purposes described, the same being removably secured therein, a false bottom for the mold, there being openings therein to permit said bottom to pass down over the said cores, removable panels for the mold for the purposes set forth, means for securing said panel in said mold and adjustable means for varying the inclosing space of the mold for making various-sized blocks.

9. A mold consisting of the combination of two L-shaped members resting on a common support to form an inclosure, clamping means for securing the members together, cores within the inclosure, a false bottom having openings therethrough to pass down over the cores, cores for the mold, the ends of the members being cut under to permit them to pass over said bottom, a thread-bar carried in the end of one of the members, a head carried at the inner end of the thread-bar, and a removable panel located between the head and end of the mold and having a roughened depression therein for the purposes explained, the members adapted to be widely separated to entirely free the false bottom so that it may be raised to remove the formed block from the mold.

In testimony whereof I affix my signature in presence of two witnesses.

MILTON H. JOHNSON.

Witnesses:
L. M. THURLOW,
E. J. ABERSOL.